(12) United States Patent
Hardy et al.

(10) Patent No.: US 10,999,720 B2
(45) Date of Patent: May 4, 2021

(54) DEFINING AUTOMATIONS FOR ENROLLED USER DEVICES

(71) Applicant: VMware, Inc., Palo Alto, CA (US)

(72) Inventors: Adam Michael Hardy, Alpharetta, GA (US); Carlos Carbonell, Altanta, GA (US); Jason Bedient, Palo Alto, CA (US); Binjie Sun, Atlanta, GA (US); Qi Gao, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/571,576

(22) Filed: Sep. 16, 2019

(65) Prior Publication Data

US 2020/0186982 A1   Jun. 11, 2020

Related U.S. Application Data

(63) Continuation of application No. 16/215,795, filed on Dec. 11, 2018, now Pat. No. 10,440,537.

(51) Int. Cl.
| | |
|---|---|
| *H04W 4/50* | (2018.01) |
| *H04L 29/06* | (2006.01) |
| *G06F 16/245* | (2019.01) |
| *G06F 9/451* | (2018.01) |
| *G06F 8/65* | (2018.01) |

(52) U.S. Cl.
CPC ............... *H04W 4/50* (2018.02); *G06F 8/65* (2013.01); *G06F 9/451* (2018.02); *G06F 16/245* (2019.01); *H04L 63/20* (2013.01)

(58) Field of Classification Search
CPC ........ H04W 4/50; G06F 9/451; G06F 16/245; G06F 8/65; H04L 63/20; H04L 63/1416; H04L 67/303; H04L 67/125
See application file for complete search history.

(56) References Cited

U.S. PATENT DOCUMENTS

| | | | | |
|---|---|---|---|---|
| 5,826,250 | A | * | 10/1998 | Trefler ............... G06N 5/02 |
| | | | | 706/50 |
| 2005/0138169 | A1 | | 6/2005 | Bahr |
| 2006/0218164 | A1 | | 9/2006 | Shinmura et al. |
| 2006/0242030 | A1 | | 10/2006 | Blanchard et al. |
| 2007/0112853 | A1 | * | 5/2007 | Dettinger ............ G06N 5/025 |
| 2008/0263375 | A1 | | 10/2008 | Sundstrom et al. |

(Continued)

FOREIGN PATENT DOCUMENTS

WO    2008083486 A1   7/2008

*Primary Examiner* — Dinh Nguyen

(74) *Attorney, Agent, or Firm* — Thomas | Horstemeyer, LLP

(57) ABSTRACT

Various examples are described for defining automations for client devices enrolled with a management service. A computing environment can cause one or more user interfaces to be shown in a display of an administrator device that include at least one field for receiving a conditional statement to generate an automation associated with client devices enrolled with the management service. The computing environment can validate the conditional statement based on validation criteria and, in an instance in which the conditional statement has been validated, generate the automation based on the conditional statement, the automation causing the computing environment to perform a predetermined action automatically when the conditional statement is satisfied.

20 Claims, 5 Drawing Sheets

(56) References Cited

U.S. PATENT DOCUMENTS

| | | | |
|---|---|---|---|
| 2008/0305832 A1* | 12/2008 | Greenberg | H04W 8/18 |
| | | | 455/557 |
| 2009/0012949 A1* | 1/2009 | Thompson | G06F 16/9535 |
| 2009/0117949 A1 | 5/2009 | Allen et al. | |
| 2011/0264650 A1* | 10/2011 | Tobin | G06F 16/248 |
| | | | 707/722 |
| 2012/0254762 A1* | 10/2012 | Parmar | G06Q 30/02 |
| | | | 715/736 |
| 2013/0117804 A1* | 5/2013 | Chawla | G06F 21/53 |
| | | | 726/1 |
| 2013/0159260 A1* | 6/2013 | VanGompel | G06F 16/2365 |
| | | | 707/690 |
| 2013/0254401 A1* | 9/2013 | Marshall | H04L 63/104 |
| | | | 709/226 |
| 2014/0280217 A1* | 9/2014 | Stibel | G06Q 10/06393 |
| | | | 707/748 |
| 2016/0162384 A1* | 6/2016 | Shida | G06F 8/31 |
| | | | 717/130 |
| 2016/0253159 A1* | 9/2016 | Smith | G06F 8/61 |
| | | | 717/172 |
| 2016/0335816 A1* | 11/2016 | Thoppae | G07C 5/0808 |
| 2017/0171354 A1 | 6/2017 | Itogawa | |
| 2017/0237630 A1 | 8/2017 | Halmstad et al. | |

\* cited by examiner

DEFINING AUTOMATIONS FOR ENROLLED USER DEVICES

CROSS-REFERENCE TO RELATED APPLICATION

The application is a continuation of, and claims the benefit of and priority to, U.S. patent application Ser. No. 16/215,795 entitled "DEFINING AUTOMATIONS FOR ENROLLED USER DEVICES," filed Dec. 11, 2018, the contents of which being incorporated in their entirety herein.

BACKGROUND

Various operating systems offer mobile device management (MDM) capabilities that permit third-party applications to secure and oversee operation of a device. Unified endpoint management (UEM) solutions enable administrators of enterprises and other organizations to secure and oversee the operation of a multitude of various types of devices having various types of operating systems and MDM capabilities, such as smartphones, desktop computers, laptops, tablets, and peripheral devices.

Generally, UEM solutions include a management service hosted in a remote computing environment, where the management service permits administrators to secure and oversee operation of the multitude of devices through a single portal, referred to as an administrator console. Through the administrator console, administrators of the management service can review particular information for enrolled devices. However, viewing data for enrolled devices remains problematic as the management service can oversee hundreds to thousands of devices, each having unique characteristics and configurations. As such, it remains problematic for administrators to identify devices or deployment issues that require attention. It also remains problematic to know the potential impact of a change in a MDM policy.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
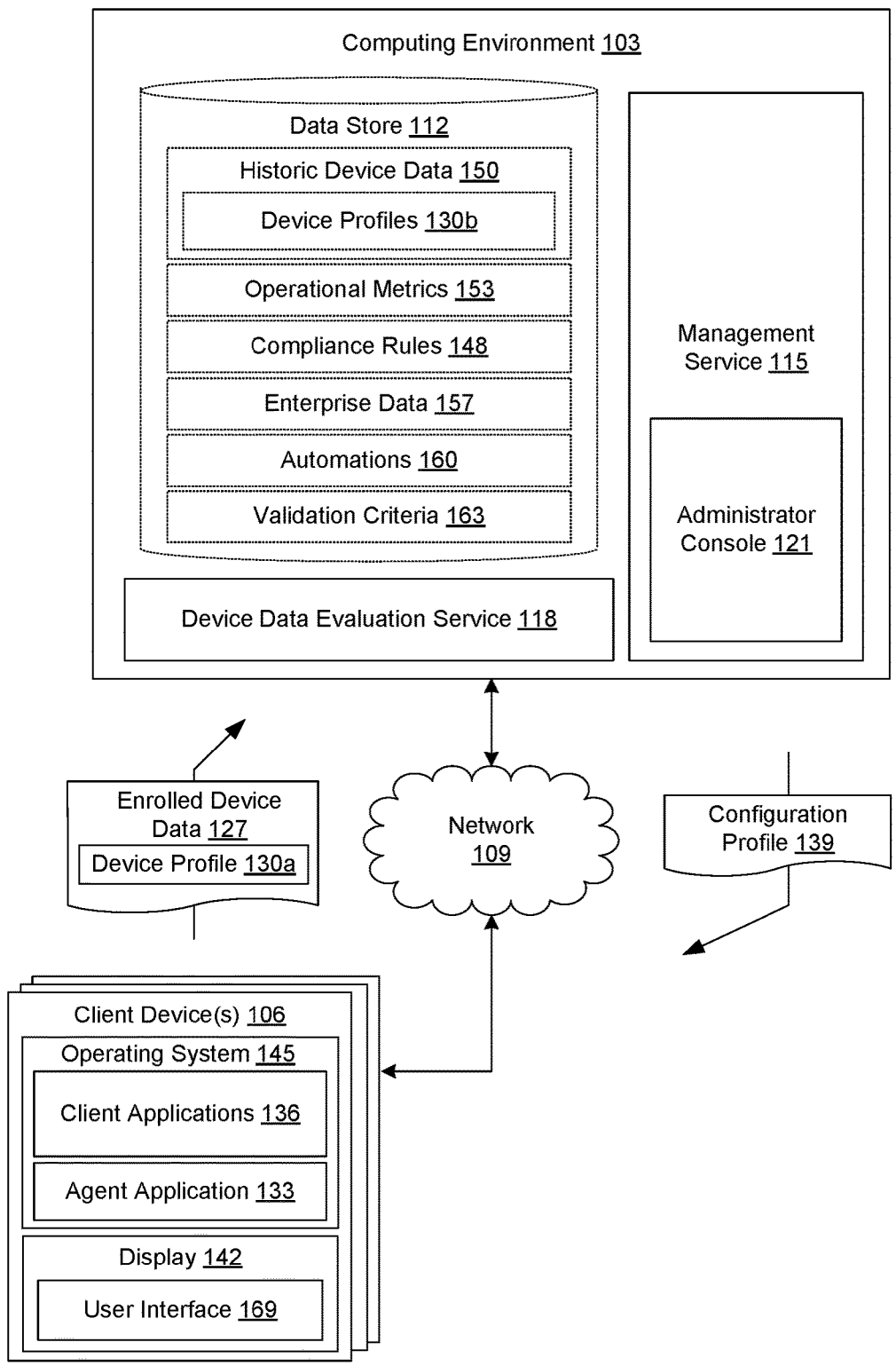
FIG. 1 is a drawing of a networked environment that includes a management service and an administrator console that enable automations to be created and impacted devices to be forecasted.

The present disclosure relates to defining automations for client devices enrolled with a management service as well as dynamically determining information associated with devices affected by automations. Administrators of an enterprise or other organization, which usually include information technology (IT) personnel, can utilize a management service to secure and oversee operation of devices enrolled with a management service. Through an administrator console, administrators can define actions or events to occur when predefined criteria has been met by one or more devices. For instance, if a state of a device indicates that the device is a security risk, the administrator can specify remedial actions to be taken by the management service, such as removing the device from a network, requiring the device to perform a virus scan, or other action that could alleviate the security risk.

While it can be more intuitive to configure devices having common operating systems, hardware, and other software, it becomes difficult to configure devices having increasingly varying operating systems, hardware, application versions, firmware versions, and other specifications. For instance, in bring-your-own-device (BYOD) environments, the devices used by employees can range from devices that utilize the Android® operating system by Google®, the iOS operating system by Apple®, the Windows® operating system by Microsoft®, or other operating system. These devices also can have different versions of operating systems, different security patches, etc. Additionally, the devices can be manufactured by various device manufacturers and include varying hardware specifications and settings.

Assume, for instance, that an administrator intends to install a security patch on all devices in a bring-you-own-device environment. There is a probability that installing the security patch on incorrectly configured devices could result in "breaking" a vast amount of devices or, in other words, making the devices not function as intended. As such, it is beneficial to have an administrator console that provides the administrator with up-to-date and accurate information of a number of devices affected or otherwise impacted by a procedure, allowing the administrator to make more granular decisions or customizations that affect smaller portions of enrolled devices. Additionally, it can be beneficial for the administrator to create automations to be performed when certain criteria is met, allowing the administrator to customize behavior when certain conditions associated with enrolled devices are met.

Accordingly, in various examples, a computing environment can provide an administrator console having one or more user interfaces that include at least one field for receiving a conditional statement to generate an automation associated with client devices enrolled with the management service. The computing environment can validate the conditional statement based on validation criteria and, in an instance in which the conditional statement has been validated, execute a query to determine a number of the client devices affected or impacted by the conditional statement. As a result of the query, the computing environment can display information associated with a number of the client devices affected by the conditional statement.

Accordingly, technological improvements for conventional device management solutions are described. Notably, example solutions rooted in technology are described for querying device profile databases as an automation is generated, allowing an administrator to be provided with up-to-date metrics such that the administrator can make more granular automations or determine results of various policies for the management service. For instance, before implementing a new policy that requires all devices to upgrade to a latest version of an application or an operating system, administrators can determine how many devices are currently running legacy versions of the operating system (as opposed to those that have already upgraded). The metrics can be beneficial in determining the number of devices that will be impacted as a result of the policy change as well as other issues that could occur, for instance, regarding the operation of frequently used features or applications. Additionally, administrators can desire to view the number of devices upgrading in real time.

Turning now to FIG. 1, an example of a networked environment 100 is shown. The networked environment 100 can include a computing environment 103 and one or more client devices 106 in data communication with one another over a network. The network can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include one or more computing devices that are arranged, for example, in a server bank, computer bank, or other arrangement. The computing environment 103 can include a grid computing resource or any other distributed computing arrangement. The computing devices of the computing environment 103 can be located in a single installation or can be distributed among many different geographical locations. The computing environment 103 can also include or be operated as one or more virtualized computer instances executing in one or more computing devices.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network, the computing environment 103 can be described as a remote computing environment 103 or a cloud computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a device data evaluation service 118, as well as other applications, services, processes, systems, engines, or functionality not discussed in detail herein. While the device data evaluation service 118 is shown separate from the management service 115, in some examples, the device data evaluation service 118 can include logic of the management service 115.

The management service 115 can be executed to manage and oversee the operation of client devices 106, for instance, those enrolled or planned to be enrolled with the management service 115. In some examples, an organization, such as a company, enterprise, or other entity, can operate the management service 115 to manage or oversee the operation of the client devices 106 of its employees, contractors, customers, or other individuals having accounts with the organization. In some examples, various settings and tasks performed by the management service 115 can be defined by administrators of the management service 115.

For example, if the management service 115 is employed for employees of an enterprise, the administrators can include information technology personnel of the organization tasked with overseeing operation of the client devices 106 enrolled with the management service 115. As such, the management service 115 can provide an administrator console 121 that permits administrators to define policies and other criteria for a client device 106 to remain in compliance with the management service 115. Additionally, through the administrator console 121, the administrators can specify configurations of the client devices 106 that can be carried out through interaction with an agent application 133 on each of the client devices 106.

The device data evaluation service 118 can receive enrolled device data 127 collected by the agent application 133 (or other client application 136) on each of the client devices 106 and generate metrics, graphics, or other information that can be useful in evaluating the configuration or performance of the client devices 106 enrolled with the management service 115. The enrolled device data 127 can include data describing a particular state or configuration of a client device 106 in some examples, referred to as a device profile 130. For instance, the device profile 130 for a client device 106 can include a listing of the client applications 136 installed on the client device 106, versions of the client applications 136 and associated settings, hardware settings, software settings, usage statistics, as well as other data.

In some examples, an agent application 133 executable on the client device 106 generates the device profile 130 for transmission to the computing environment 103. The management service 115 interacts with the agent application 133 on a client device 106 to enroll the client device 106 with the management service 115. Enrollment can include authenticating the client device 106 using login information, such as an email address, username, or password, as well as device information or biometric information.

The agent application 133 can include one of several client applications 136 on the client device 106. However, the agent application 133 can vary from other client applications 136 as it has the ability to be registered as a device administrator of the client device 106 through management application programming interfaces (APIs) of an operating system, which can provide the agent application 133 with sufficient privileges to control operation of various functions of the client device 106. Further, the agent application 133 can configure a client device 106 in accordance with data provided to the client device 106 for the management service 115, referred to as a configuration profile 139. In some examples, the configuration profile 139 can include an extensible markup language (XML) document that causes the agent application 133 to configure the client device 106 in accordance with settings or other parameters specified in the XML document. Additionally, the configuration profile 139 can include specifications of particular data for the agent application 133 to collect.

The management service 115 or the agent application 133 can instruct the client device 106 to check-in with the management service 115 periodically, randomly, or based on a check-in schedule by sending enrolled device data 127 to the computing environment 103. In some examples, the enrolled device data 127 can include data pertaining to the configuration or operation of the client device 106. For instance, in some examples, the enrolled device data 127 can include the device profile 130 that includes hardware or software settings of the client device 106.

In the device profile 130, the hardware settings can include user-specified configurations and other data pertaining to a display 142, camera, speaker, keyboard, mouse, global positioning system (GPS), other geo-location hardware, or other hardware of the client device 106. Also in the device profile 130, the software settings can include user-specified configurations or other data pertaining to an operating system 145, client applications 136, or other software of the client device 106. For instance, software settings can include a list of installed client applications 136, as well as various user-specified configurations or settings of the installed client applications 136. The enrolled device data 127 and the device profile 130 can include an XML file, data structure, or other data object having data that can be sent over the network 109. Traditionally, the enrolled device data 127 collected by the agent application 133 can be evaluated by the management service 115 to determine whether a client device 106 is in compliance with one or more compliance rules 148 specified by the administrators.

The data stored in the data store 112 can include, for example, historic device data 150, operational metrics 153, compliance rules 148, enterprise data 157, automations 160, validation criteria 163, as well as other data. Historic device data 150 can include data pertaining to a client device 106 enrolled or managed by the management service 115 stored in the data store 112. For instance, when a client device 106 checks in with the management service 115, the management service 115 can store the enrolled device data 127 (or other data received during the check-in), or the device profile 130 of a given client device 106, as historic device data 150. As such, the management service 115 can maintain historic device data 150 for client devices 106 enrolled with the management service 115, where the historic device data 150 describes past and most-recent configurations of the client devices 106.

Operational metrics 153 can include metrics derived from enrolled device data 127 that describe operation of the client devices 106 enrolled with the management service 115. In some examples, operational metrics 153 can be generated for a single one of the client devices 106. In other examples, operational metrics 153 can be generated for groups of client devices 106 enrolled with the management service 115. In some examples, operational metrics 153 can include a number of devices having a particular version or type of operating system installed thereon. In other examples, operational metrics 153 can include a number of devices having a particular client application installed thereon that requires a software license. In other examples, operational metrics 153 can include health scores describing an operation of one or more client devices 106, or an overall system health score describing operation of the management service 115 based on parameters specified by the administrators. In further examples, the operational metrics 153 can include a number of client devices 106 to be affected by a change in policy implemented through the management service 115 or the administrator console 121.

Compliance rules 148 can include criteria specified by administrators to secure or oversee operation of client devices 106 enrolled with the management service 115. For instance, administrators can specify criteria for a client device 106 to be in compliance with the management service 115. If a client devices 106 is not in compliance with the management service 115, the management service 115 can perform actions predefined by the administrators, such as denying access to enterprise data 157, reconfiguring a client device 106, notifying an operator of the client device 106, as well as other actions.

Enterprise data 157 can include data served up by the management service 115 which can include enterprise documents, emails, instant messaging communications, network printer data, or other data. Automations 160 can include conditional statements specified by administrators having criteria that, when met, cause a predefined task to be performed, as will be discussed. An automation 160 can be described as having one or more IF-THEN statements in some examples. For instance, an administrator can specify that, if a client device 106 has a particular type or version of operating system 145 installed thereon, then the management service 115 will cause a particular version of a client application 136 to be installed on the client device 106 that is compatible with the type or version of operating system 145.

In various examples, the management service 115 can generate one or more user interfaces 169 having fields that obtain information regarding a desired configuration of client devices 106 enrolled (or to be enrolled) with the management service 115. The user interfaces 169 can be accessed by an administrator through the administrator console 121. Using these user interfaces 169, administrators can provide information regarding how the administrators desire the client devices 106 to operate. In another example, administrators can specify one or more client applications 136 to be installed on the client devices 106. In yet another example, the administrator can specify settings to be configured on the client devices 106, such as Wi-Fi network settings, virtual private network (VPN) settings, email server settings, or other settings. The agent application 133 can configure the device in accordance with these settings. In another example, the administrator can specify settings that cause the client device 106 to toggle between modes of operation, such as during work hours or when the client device 106 is in a particular geo-location.

Even further, the management service 115 can generate one or more user interfaces 169 having fields that obtain information regarding an automation 160 to be defined and implemented in the computing environment. The one or more user interfaces 169 can be accessed in the administrator console 121 in some examples. For instance, an administrator can specify that, if a client device 106 has an out-of-date version of a security patch installed thereon, then the management service 115 will automatically take action to cause the client device 106 to update to a most-recent version of a security patch. Prior to the creation of an automation 160, or prior to determining a number of devices to be affected by the automation 160, one or more conditional statements defined by an administrator can be validated using validation criteria 163. Validation criteria 163 can include criteria that requires a conditional statements to follow a predetermined format, use one or more valid values, or similar parameter as can be appreciated.

Based on the settings specified by an administrator in the user interfaces 169, the management service 115 can generate a configuration profile 139 that is published for one or more client devices 106. When published, the agent application 133 on the client device 106 can identify the configuration profile 139 as being applicable to the client device 106 and, as a result, can download and configure the client device 106 in accordance with the settings set forth in the configuration profile 139. Further, the one or more user interfaces 169 can permit the administrator to specify compliance rules 148 as well as actions to be performed based on the compliance rules 148.

In some examples, the configuration profile 139 can direct the agent application 133 to configure hardware or software functionality of a client device 106 such that the client device 106 operates in conformance with the compliance rules 148 or other criteria specified in the configuration profile 139. Additionally, the management service 115 can identify when the client device 106 is not in conformance with the compliance rules 148 and can take appropriate remedial actions, such as denying access to enterprise data 157, enterprise applications, or performing other actions.

In some examples, the management service 115 communicates with the agent application 133 or other client application 136 executable on the client device 106 to determine whether vulnerabilities exist on the client device 106 that do not satisfy policies defined by an administrator. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications 136, or other vulnerability as can be appreciated.

The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a peripheral device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include the operating system 145, which can be configured to execute various client applications 136, such as the agent application 133, as well as other applications. Some client applications 136 can access enterprise data 157 and other network content served up by the computing environment 103 or other servers, thereby rendering a user interface 169 on a display 142, such as a liquid crystal display (LCD), touch-screen display, or other type of display device. To this end, some client applications 136 can include a browser or a dedicated application, and a user interface 169 can include a network page, an application screen, or other interface. In some examples, a network page can include a web page having source code defined in hypertext markup language (HTML), cascading style sheets (CSS), Javascript, jQuery, or other applicable client-side web-based scripting language. Further, other client applications 136 can include device management applications, enterprise applications, social networking applications, word processors, spreadsheet applications, media viewing applications, instant messaging applications, or other applications.

Figure 2:
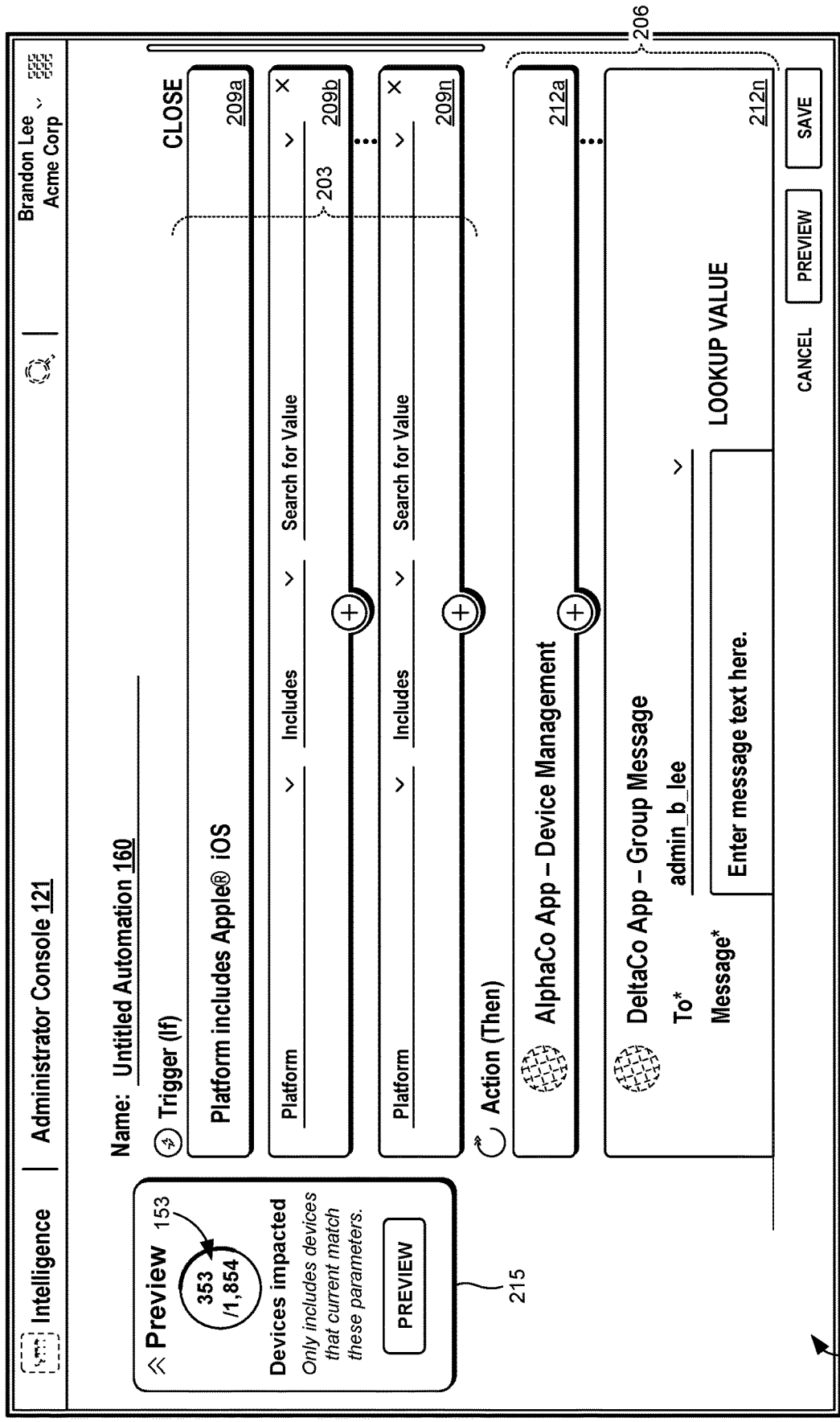
FIGS. 2-4 are example user interfaces that permit administrators to define automations to be performed in association with devices enrolled with the management service.

Referring next to FIG. 2, an example of a user interface 169 is shown. More specifically, the user interface 169 of FIG. 2 includes an example of a portion of the administrator console 121 that permits an administrator to create an automation 160, referred to in FIG. 2 as "Untitled Automation." While a single user interface 169 is shown, it is understood that multiple user interfaces 169 can be used to create an automation 160.

An automation 160 can include one or more conditional statements specified by administrators in the user interface 169 having criteria associated with client devices 106 enrolled with the management service 115 that, when met, cause a predefined task to be performed. In some examples, a conditional statement can be generated based at least in part on values specified in a first subset of fields corresponding to an IF statement and values specified in a second subset of the fields corresponding to a THEN statement, as will be described.

For instance, as shown in the user interface 169 of FIG. 2, a first region 203 of the user interface 169 can receive a specification of an IF statement (a condition) and a second region 206 of the user interface 169 can receive a specification of a THEN statement (an action to be performed when the condition is met). The user interface 169 thus enables the administrator to define granular automations 160 only affecting a certain subset of client devices 106 enrolled with the management service 115, as can be appreciated.

In some examples, the first region 203 can include condition cards 209a . . . 209n (collectively "condition cards 209"). Each of the condition cards 209 can include fields that allow the administrator to specify values to create a valid IF statement. In one example, the administrator can select "Platform," "includes," and "Apple® iOS" in the condition card 209 to arrive at the first condition card 209a, which is shown as being configured. As such, an action defined for the automation 160 will only be performed on a client device 106 if the client device 106 has the Apple® iOS platform. The "Platform" value can refer to a type of operating system 145 or a type of client device 106. As can be appreciated, the values of the first action card 209a can be adjusted by selecting or otherwise manipulating the first action card 209a.

The condition created in the first condition card 209 can be further narrowed through configuration of additional condition cards 209. For instance, the configuration of the second condition card 209b will create an AND condition between the first condition card 209a and the second condition card 209b. As such, the administrator can further define the IF statement by configuring additional condition cards 209, for instance, until a complete IF statement has been customized. Through use of the user interface 169, an administrator can "program" or develop sophisticated automations 160 without the use of complicated programming languages or service-specific APIs, as can be appreciated.

As can be appreciated, in place of "Platform," the administrator can choose from other potential parameters, such as "Platform Version," "Is App Installed," "App Install Time," "Update Install Time," or other parameter useful for device management. Also, in place of "Includes," the administrator can select "Equals," "Is Greater Than," "Is Less Than," "Is Equal To or Greater Than," Is Equal To or Less Than," "Is a Substring of," or other parameter. The "Search for Value" field in some example can receive free-form text or a list of likely values given a specification of the first two fields, such as "Platform" and "Includes."

Turning now to the second region 206, the user interface 169 can include one or more action cards 212a . . . 212n (collectively "action cards 212"). Like the condition cards 209, each of the action cards 212 can include fields that allow the administrator to specify values to define one or more actions to be automatically performed by the management service 115 when the criteria specified in the IF statement has been met. In some examples, action cards 212 can correspond to an application or service, including a third-party action or service. To this end, an administrator can select an action card 212 corresponding to a third-party application or service to direct the third-party application or service to perform a predetermined task when the IF condition has been satisfied. For instance, as shown in FIG. 2, the action card 212 for the "DeltaCo App" has been selected and configured to send a message to "admin_b_lee" ("administrator Brandon Lee") when the criteria in the IF statement has been satisfied.

The user interface 169 can further include a preview region 215. The preview region 215 can include one or more operational metrics 153 generated based on the IF statement created through configuration of the condition cards 209 and/or the THEN statement created through configuration of the action cards 212. In some examples, an operational metric 153 can include a number of client devices 106 enrolled with the management service 115 that would be affected by the automation 160. Further, in some examples, this operational metric 153 can be shown relative to another operation metric 153, such as a total number of client devices 106 enrolled with the management service 115. For instance, based on the IF statement specified in FIG. 2 ("IF Platform includes Apple® iOS"), the number of client devices 106 affected would include 353 devices out of 1,854 total devices enrolled with the management service 115. In other examples, the number of affected or impacted client devices 106 can be shown relative to another operational metric 153, such as a number of client devices 106 in a particular user group, having a particular configuration or specification, or other operational metric 153 as can be appreciated.

In some examples, the one or more of the operational metrics 153 shown in the user interface 169 can be generated or updated dynamically and in real-time. In other words, while a user customizes the IF statement or the THEN statement in the user interface 169, the number of affected client devices 106 shown can be updated based on the customization. To this end, in some examples, when a change to a field or a value in the user interface 169 is detected, the management service 115 can generate and execute a query. In some examples, the management service 115 can execute the query to determine a number of the client devices affected by the one or more conditional statements made in the user interface 169.

To generate one or more of the operational metrics 153, in some examples, the management service 115 can execute the query on a database of device profiles 130, such as those stored in the data store 112 as historic device data 150. The query can be generated based on the conditional statement generated in the user interface 169. For example, given the first action card 209*a* having the conditional statement of "Platform includes Apple® iOS," an example of a structured query language (SQL) query can include:

SELECT devices FROM device_profile_table WHERE platform='iOS', which would return a data structure having each device with a platform of "iOS," as well as any other data stored in a row associated with the devices. Another example of a SQL query can include:

SELECT COUNT(*) FROM device_profile_table WHERE platform='iOS', which would return only the number of client devices 106 having the platform of "iOS," or, in other words, a number of the client devices 106 that would be affected by the conditional statement shown in the user interface 169 of FIG. 2.

The user interface 169, in some examples, can include a network page. In these examples, the query can be generated as a background process using an asynchronous javascript and extensible markup language (AJAX) script included in source code of the network page. In other words, the network page is not refreshed and the administrator is not redirected to another network page. Rather, the operational metrics 153 shown in the preview region 215 (or other region) are updated dynamically and in real-time. Alternatively, a Flash® by Adobe® application can be included in the network page to make POST or GET calls without causing a refresh or a navigation to another network page. In other examples, a j QUERY script or a $.getJSON script can be used to make POST or GET calls without causing a refresh or a navigation to another network page.

Further, in some examples, prior to generating and executing the query, the conditional statement created by the administrator (through interaction with the condition cards 209 and the action cards 212) can be validated based at least in part on validation criteria 163. Validation criteria 163 can include criteria that requires a conditional statements to follow a predetermined format, use one or more valid values, or similar parameter as can be appreciated. For example, if the administrator selected the value of "Platform" for a field in the second condition card 209, a valid value for the field can include "Apple® iOS," "Android®," "Linux," "Windows®," or other platform.

Figure 3:
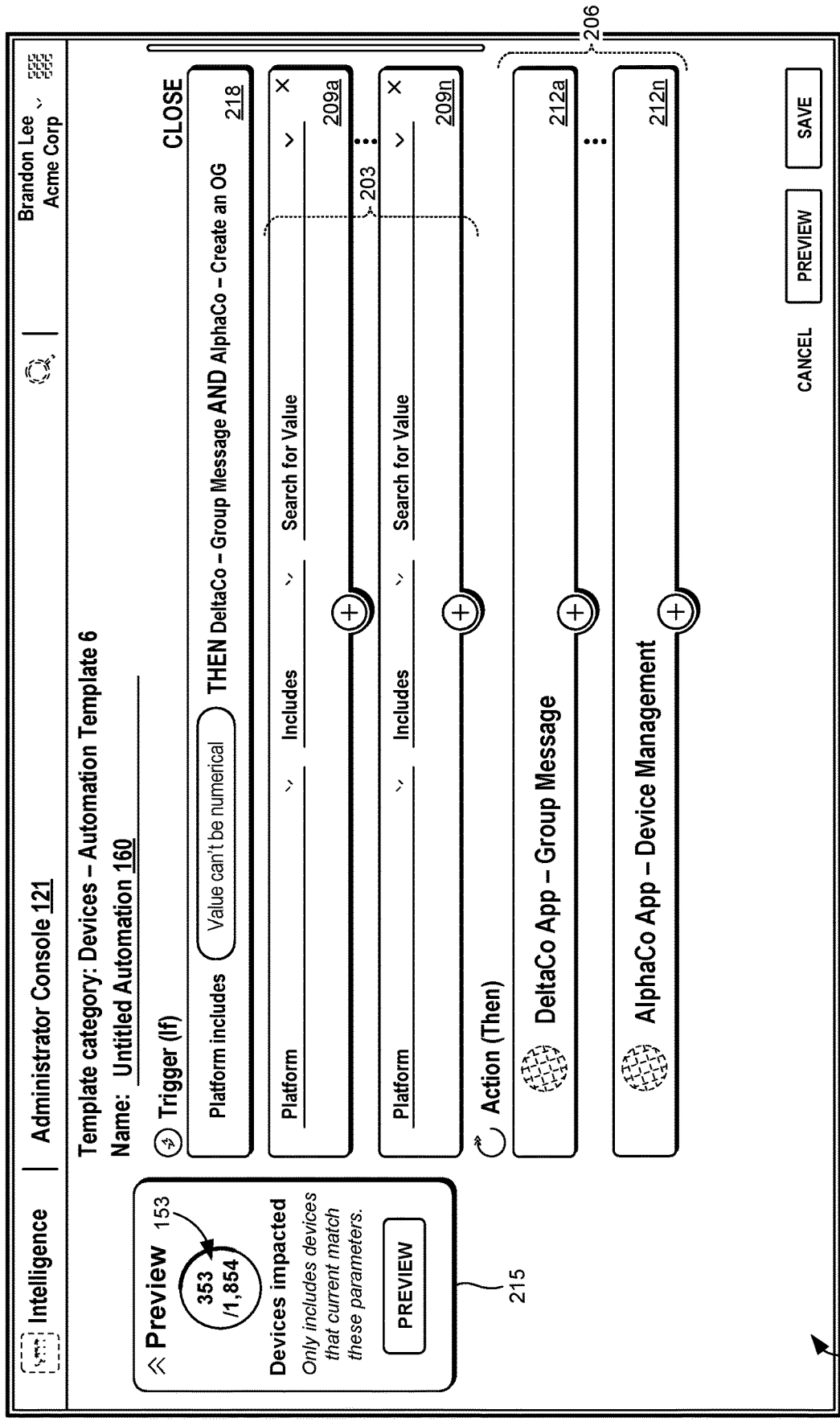

For instance, referring now to FIG. 3, an error card 218 can be shown when a conditional statement created by an administrator does not comply with validation criteria 163. As shown in FIG. 3, the error card 218 includes at least a portion of the conditional statement specified by the administrator; however, the value that does not comply with the validation criteria 163 is emphasized in a portion of the conditional statement. In the example of FIG. 3, the error card 218 notes that the administrator provided a numerical value for the "Platform" field, which is not a valid input ("Value can't be numerical").

In some examples, a portion of the condition card 209 or the action card 212 having an error can be emphasized such that the administrator knows which card does not pass the validation criteria 163. For instance, a bottom line on a card can change from blue to red (or other change in color) to show that the statement does not pass the validation criteria. In another example, a bottom line on a card can change from blue to green (or other change in color) to show that the statement has, in fact, passed the validation criteria 163.

In some examples, the user interface 169 can present data pertaining to the client devices 106 enrolled with the management service 115 such that the administrators can make informed decisions pertaining to overseeing and configuring the client devices 106. For instance, based on the data presented in the user interface 169, the administrators can determine whether to create new automations 160 or modify existing policies. To assist with the presentation of data collected from the client devices 106, the management service 115 or the device data evaluation service 118 can generate operational metrics 153 using the enrolled device data 127 that describes operation of the client devices 106.

Figure 4:
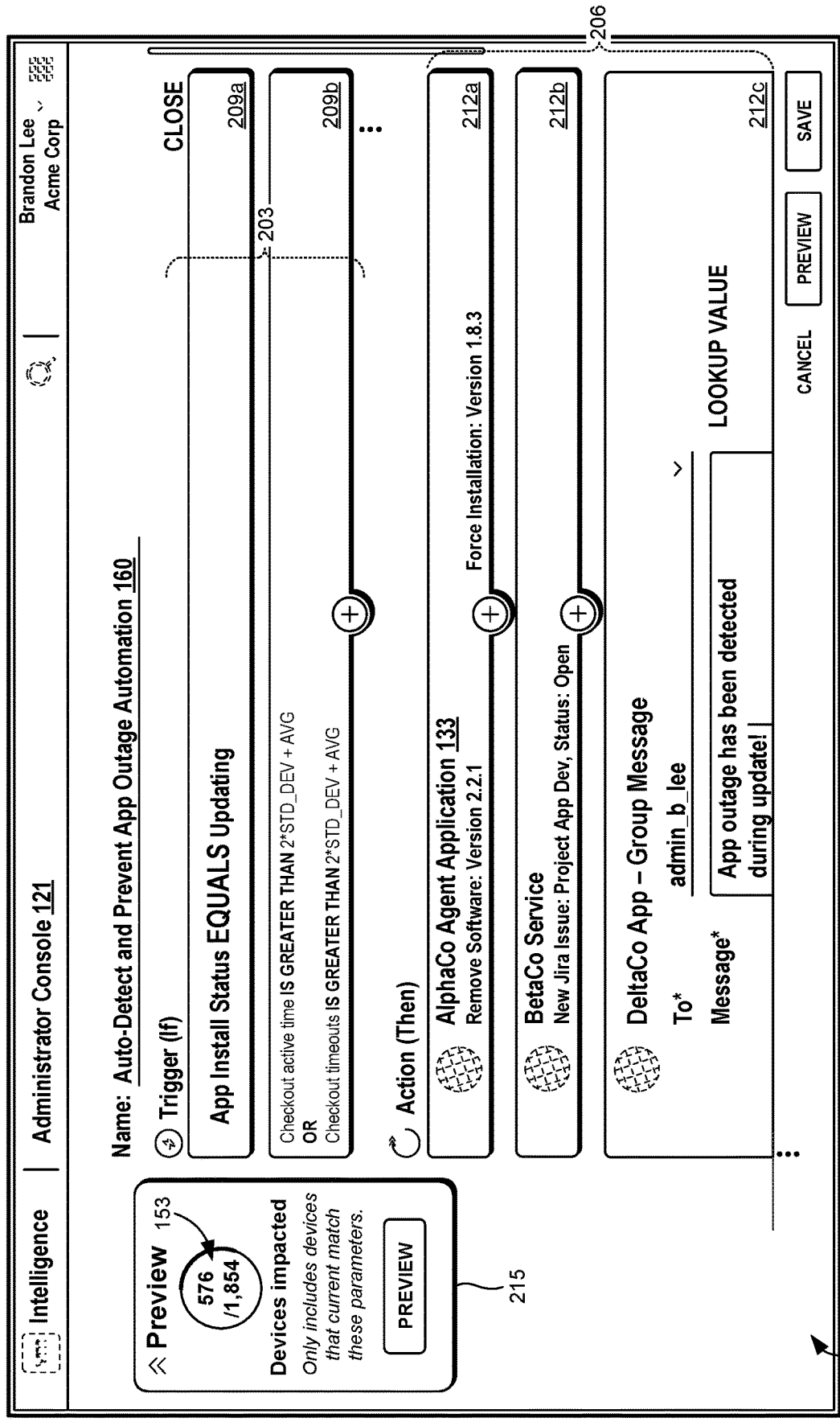

Referring next to FIG. 4, another example of a user interface 169 of the administrator console 121 is shown. More specifically, the user interface 169 of FIG. 4 includes another example of a conditional statement that can be generated using the condition cards 209 and the action cards 212. Notably, the user interface 169 of FIG. 4 includes one or more conditional statements to generate an automation 160 ("Auto-Detect and Prevent App Outage Automation") that automatically detects when a client application 136 has become unavailable on a substantial number of client devices 106 enrolled with the management service 115, for instance, when the client application 136 stalls or "timeouts" during an update.

A first condition card 209*a* is shown having been configured to create the conditional statement of "App Install Status EQUALS Updating." As such, the automation 160 will trigger one or more actions when an install status of a client application 136 equals "updating" and the conditional statement in the second condition card 209*b* has been met. The second condition card 209*b* includes a conditional statement that causes the management service 115 to determine whether a number of client devices 106 have an active checkout time of the client application 136 greater than two times the standard deviation added to the average active checkout time, as well as whether a number of client devices 106 having a checkout timeout of the client application 136 is greater than two times the standard deviation added to the average checkout timeout. The condition created in the first condition card 209a and the second condition card 209b can be further narrowed through configuration of additional condition cards 209, as can be appreciated.

The operational metric 153 shown in the preview region 215 shows a number of client devices 106 that would be impacted by the automation 160, if implemented. For instance, the operational metric 153 can include a number of client devices 106 that have the particular client application 136 installed thereon that would be affected by an update.

The first action card 212a indicates that an instruction is sent to the agent application 133 to perform a remedial action when an update of a client application 136 has stalled or otherwise timed-out. The remedial action can include, for instance, aborting the update, restarting the update, or other action as can be appreciated. The second action card 212b indicates that an instruction is sent to the "BetaCo Service" to create a new ticket in an issue and project management service, such as Jira®. The third action card 212c indicates that a communication is sent to the administrator Brandon Lee indicating that an application outage has occurred during an update.

Figure 5:
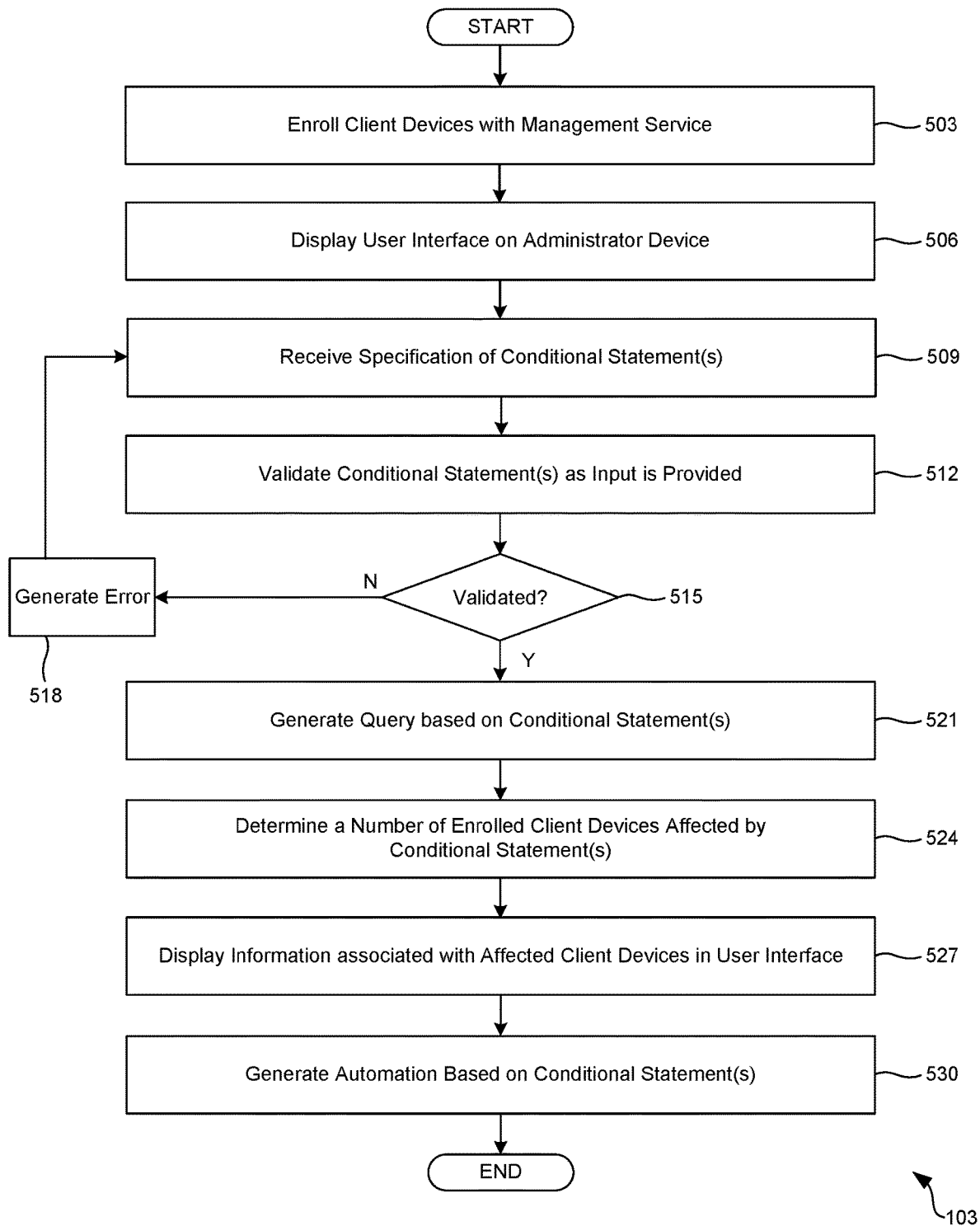
FIG. 5 is a flowchart showing an example operation of a management service according to various examples.

Referring now to FIG. 5, a flowchart is shown that provides one example operation of the management service 115, the device data evaluation service 118, or the administrator console 121 according to various examples. The flowchart of FIG. 5 can be viewed as depicting an example of elements of a method implemented by the computing environment 103 executing in the networked environment 100 according to one or more examples. The separation or segmentation of functionality as discussed herein is presented for illustrative purposes only.

Beginning with step 503, the computing environment 103 can enroll client devices 106 with the management service 115. In some examples, the computing environment 103 can interact with the agent application 133 to enroll a client device 106 with the management service 115. For instance, a user of a client device 106 can install an instance of the agent application 133 on his or her device and provide authentication information to access enterprise data 157 on the client device 106. The agent application 133 can check-in with the management service 115 such that the agent application 133 is registered as a device administrator of the client device 106 through management APIs of an operating system. As a result, the agent application 133 is provided with privileges to control and manage operation of various functions of the client device 106.

In step 506, the computing environment 103 can display one or more user interfaces 169 on an administrator device. For instance, the management service 115 can provide an administrator console 121 having one or more user interfaces 169 that permit administrators to define policies and other criteria for a client device 106 to remain in compliance with the management service 115. Through the administrator console 121, the administrators can specify configurations of the client devices 106 that can be carried out through interaction with an agent application 133 on each of the client devices 106. Additionally, the administrator console 121 can enable administrators to create and customize automations 160, which can include conditional statements specified by administrators having criteria that, when met, cause a predefined task to be performed automatically. For instance, the management service 160 can periodically receive device profiles 130 from client devices 106 enrolled with the management service 115. Upon receipt of a device profile 130, the management service 115 can compare the device profile 130 to active ones of the automation 160.

Next, in step 509, the computing environment 103 can receive a specification of a conditional statement, for instance, in the administrator console 121. In some examples, the conditional statement can be generated based at least in part on values specified in a first subset of fields corresponding to an IF statement and values specified in a second subset of the fields corresponding to a THEN statement. As shown in the user interface 169 of FIG. 2, the first region 203 of the user interface 169 can receive a specification of an IF statement (having one or more conditions), and the second region 206 of the user interface 169 can receive a specification of a THEN statement (having one or more actions to be performed when the one or more conditions are met).

In step 512, the computing environment 103 can validate the conditional statement, for instance, as input is provided in the user interface. In some examples, a script or a watch event for a user interface 169 is executed as a background process to identify changes to any fields or values of the fields while the user interface 169 is shown on a display 142 of an administrator device. In some examples, an AJAX script is included in source code of the network page, where the AJAX script is configured to detect changes to the user interface 169, determine whether the conditional statement complies with validation criteria 163, and execute queries to update operational metrics 153 shown in a preview region 215, or other region, in real-time.

Thereafter, in step 515, the computing environment 103 can determine whether the conditional statement has been validated, for instance, by determining whether the conditional statement complies with validation criteria 163. Validation criteria 163 can include criteria that requires a conditional statements to follow a predetermined format, use one or more valid values, or similar parameter as can be appreciated.

If the conditional statement is not validated, the process can proceed to step 518. In step 518, the computing environment 103 can generate an error. For instance, referring back to FIG. 3, an error card 218 can be shown when a conditional statement created by an administrator does not comply with validation criteria 163. The error card 218 can include at least a portion of the conditional statement specified by the administrator; however, the value that does not comply with the validation criteria 163 is emphasized in a portion of the conditional statement. Referring back to FIG. 5, after the error has been generated, the process can revert to step 509 to continue receipt of a specification of a conditional statement.

Alternatively, if the conditional statement has been validated in step 515, the process can proceed to step 521. In step 521, the computing environment 103 can generate a query based on the conditional statement specified by the administrator in the administrator console 121. In some examples, the computing environment 103 can generate the query to determine a number of the client devices 106 enrolled with the management service 115 that will be impacted by the conditional statement (or the automation 160 that includes the conditional statement).

In some examples, the computing environment 103 can generate the query such that it is executed on a database of device profiles 130, such as those stored in the data store 112 as historic device data 150. The query can be generated based on the conditional statement generated in the user interface 169 in some examples. For instance, if an administrator desires to only interact with client devices 106 manufactured by AlphaCo ("Manufacturer includes AlphaCo," an example of a structured query language (SQL) query can include:

SELECT COUNT(*) FROM device_profile_table WHERE manufacturer='alphaco', which would return a number of client devices 106 enrolled with the management service 115 manufactured by AlphaCo. As such, in step 524, the computing environment 103 can determine a number of client devices 106 enrolled with the management service 115 that will be affected by the conditional statement or, in other words, the automation 160 that includes the conditional statement.

In step 527, the computing environment 103 can display information associated with the client devices 106 that will be affected or impacted by the automation 160 in user interface 169. For instance, the user interface 169 can include a preview region 215 having one or more operational metrics 153 shown therein. The operational metrics 153 can be generated based on the IF statement created through configuration of the condition cards 209 and/or the THEN statement created through configuration of the action cards 212. In some examples, an operational metric 153 can include a number of client devices 106 enrolled with the management service 115 that would be affected by the automation 160. Further, in some examples, this operational metric 153 can be shown relative to another operation metric 153, such as a total number of client devices 106 enrolled with the management service 115.

In other examples, the number of affected client devices 106 can be shown relative to another operational metric 153, such as a number of client devices 106 in a particular user group. Additionally, in some examples, one or more of the operational metrics 153 shown in the user interface 169 can be updated dynamically and in real-time. In other words, while a user customizes the IF statement or the THEN statement in the user interface 169 (or prior to an administrator selecting the "Cancel," "Preview," or "Save," buttons of FIGS. 2-4), the number of affected client devices 106 shown can be updated based on the customization. In some examples, when a change to a field or a value in the user interface 169 is detected, the management service 115 can generate and execute a query, as discussed in step 521.

Thereafter, in step 530, the computing environment 103 can generate an automation 160 based on the conditional statement defined in the administrator console 121. As can be appreciated, when the automation 160 is generated, the computing environment 103 can actively monitor the automation 160 (along with other automations 160) to determine whether all conditions in the automation 160 have been met. If so, the computing environment 103 can perform a predetermined action specified by the administrator when creating the automation 160. For instance, when a client device 106 enrolled with the management service 115 check-in by sending a device profile 130, the management service 115 can check the device profile 130 against any active automations 160. If the device profile 130 satisfies the conditional statements in the automation 160, the management service 115 can cause one or more actions defined in the automation 160 to be performed. Thereafter, the process can proceed to completion.

The client devices 106 or devices included in the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 136, the agent application 133, the management service 115, the administrator console 121, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 142 upon which a user interface 169 generated by the client application 136 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 136, the agent application 133, and other various systems described herein can be embodied in software or code executed by general-purpose hardware as discussed above, as an alternative, the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code stored and accessible from memory that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described examples and embodiments without departing substantially from the spirit and principles of the disclosure. All such modifications and variations are intended to be included herein within the scope of this disclosure.

Therefore, the following is claimed:

1. A system, comprising:
    at least one computing device comprising at least one hardware processor; and
    program instructions stored in memory and executable in the at least one computing device that, when executed, direct the at least one computing device to:
        enroll a plurality of client devices with a management service;
        cause a user interface to be shown in a display of an administrator device, wherein the user interface comprises at least one condition card region comprising at least one field for receiving a conditional statement and at least one action card region comprising at least one field for receive an action to perform automatically when the conditional statement is satisfied to generate an automation associated with the client devices enrolled with the management service, wherein the at least one action card region corresponds to a remote third-party application or service that directs the remote third-party application or service to perform a predetermined task when the conditional statement has been satisfied;
        validate the conditional statement based at least in part on validation criteria;
        in an instance in which the conditional statement has been validated, generate the automation based at least in part on the conditional statement;
        in an instance in which an updated device profile is received from at least one of the plurality of client devices, determine that the conditional statement has been satisfied based on data obtained from the updated device profile; and
        in an instance in which the conditional statement is satisfied, direct the remote third-party application or service to perform the action automatically as defined in the automation.

2. The system of claim 1, wherein the conditional statement is generated based at least in part on at least one value specified in a first subset of fields corresponding to an IF statement and at least one values specified in a second subset of the fields corresponding to a THEN statement.

3. The system of claim 2, wherein the action automatically performed when the conditional statement is satisfied is defined in the second subset of the fields corresponding to the THEN statement.

4. The system of claim 2, wherein the action automatically performed is an action performed by a third-party service, the action and the third-party service being defined in the second subset of the fields corresponding to the THEN statement.

5. The system of claim 1, wherein the validation criteria requires the conditional statement to follow a predetermined format or use at least one predetermined valid value.

6. The system of claim 1, wherein:
    the at least one computing device is further directed to execute a query to determine a number of the client devices affected by the conditional statement, the query being executed on a database of device profiles, individual ones of the device profiles corresponding to a respective one of the client devices enrolled with the management service;

the user interface comprises a region displaying the number of the client devices affected by the conditional statement; and in response to a change in the at least one field of the user interface, the query is generated and the number of the client devices in the user interface are updated dynamically.

7. A non-transitory computer-readable medium embodying program instructions executable in at least one computing device that, when executed by the at least one computing device, direct the at least one computing device to:

enroll a plurality of client devices with a management service;

cause a user interface to be shown in a display of an administrator device, wherein the user interface comprises at least one condition card region comprising at least one field for receiving a conditional statement and at least one action card region comprising at least one field for receive an action to perform automatically when the conditional statement is satisfied to generate an automation associated with the client devices enrolled with the management service, wherein the at least one action card region corresponds to a remote third-party application or service that directs the remote third-party application or service to perform a predetermined task when the conditional statement has been satisfied;

validate the conditional statement based at least in part on validation criteria;

in an instance in which the conditional statement has been validated, generate the automation based at least in part on the conditional statement;

in an instance in which an updated device profile is received from at least one of the plurality of client devices, determine that the conditional statement has been satisfied based on data obtained from the updated device profile; and in an instance in which the conditional statement is satisfied, direct the remote third-party application or service to perform the action automatically as defined in the automation.

8. The non-transitory computer-readable medium of claim 7, wherein the conditional statement is generated based at least in part on at least one value specified in a first subset of fields corresponding to an IF statement and at least one values specified in a second subset of the fields corresponding to a THEN statement.

9. The non-transitory computer-readable medium of claim 8, wherein the action automatically performed when the conditional statement is satisfied is defined in the second subset of the fields corresponding to the THEN statement.

10. The non-transitory computer-readable medium of claim 8, wherein the action automatically performed is an action performed by a third-party service, the action and the third-party service being defined in the second subset of the fields corresponding to the THEN statement.

11. The non-transitory computer-readable medium of claim 7, wherein the validation criteria requires the conditional statement to follow a predetermined format or use at least one predetermined valid value.

12. The non-transitory computer-readable medium of claim 7, wherein:

the at least one computing device is further directed to execute a query to determine a number of the client devices affected by the conditional statement, the query being executed on a database of device profiles, individual ones of the device profiles corresponding to a respective one of the client devices enrolled with the management service;

the user interface comprises a region displaying the number of the client devices affected by the conditional statement; and in response to a change in the at least one field of the user interface, the query is generated and the number of the client devices in the user interface are updated dynamically.

13. A computer-implemented method, comprising:

enrolling a plurality of client devices with a management service executing in at least one computing device;

causing a user interface to be shown in a display of an administrator device, wherein the user interface comprises at least one condition card region comprising at least one field for receiving a conditional statement and at least one action card region comprising at least one field for receive an action to perform automatically when the conditional statement is satisfied to generate an automation associated with the client devices enrolled with the management service, wherein the at least one action card region corresponds to a remote third-party application or service that directs the remote third-party application or service to perform a predetermined task when the conditional statement has been satisfied;

validating the conditional statement based at least in part on validation criteria;

in an instance in which the conditional statement has been validated, generating the automation based at least in part on the conditional statement;

in an instance in which an updated device profile is received from at least one of the plurality of client devices, determining that the conditional statement has been satisfied based on data obtained from the updated device profile; and in an instance in which the conditional statement is satisfied, directing the remote third-party application or service to perform the action automatically as defined in the automation.

14. The computer-implemented method of claim 13, wherein the conditional statement is generated based at least in part on at least one value specified in a first subset of fields corresponding to an IF statement and at least one values specified in a second subset of the fields corresponding to a THEN statement.

15. The computer-implemented method of claim 14, wherein the action automatically performed when the conditional statement is satisfied is defined in the second subset of the fields corresponding to the THEN statement.

16. The computer-implemented method of claim 14, wherein the action automatically performed is an action performed by a third-party service, the action and the third-party service being defined in the second subset of the fields corresponding to the THEN statement.

17. The computer-implemented method of claim 13, wherein the validation criteria requires the conditional statement to follow a predetermined format or use at least one predetermined valid value.

18. The system of claim 1, wherein:

the device profile of a respective one of the plurality of client devices comprises at least one of: a listing of client applications installed thereon; versions of client applications installed thereon; application settings;

software settings; hardware settings; and usage statistics of the respective one of the plurality of client devices;

the automation is one of a plurality of automations stored in memory;

the respective one of the plurality of client devices is configured to periodically send an updated device profile to the at least one computing device; and the at least one computing device is further directed to identify the automation as an active one of the plurality of automations in response to receipt of the updated device profile.

19. The non-transitory computer-readable medium of claim 7, wherein:

the updated device profile of a respective one of the plurality of client devices comprises at least one of: a listing of client applications installed thereon; versions of client applications installed thereon; application settings; software settings; hardware settings; and usage statistics of the respective one of the plurality of client devices;

the automation is one of a plurality of automations stored in memory;

the respective one of the plurality of client devices is configured to periodically send the updated device profile to the at least one computing device; and the at least one computing device is further directed to identify the automation as an active one of the plurality of automations in response to receipt of the updated device profile.

20. The computer-implemented method of claim 13, wherein:

the updated device profile of a respective one of the plurality of client devices comprises at least one of: a listing of client applications installed thereon; versions of client applications installed thereon; application settings; software settings; hardware settings; and usage statistics of the respective one of the plurality of client devices;

the automation is one of a plurality of automations stored in memory;

the respective one of the plurality of client devices is configured to periodically send the updated device profile to the at least one computing device; and the computer-implemented method further comprises identifying the automation as an active one of the plurality of automations in response to receipt of the updated device profile.

* * * * *